May 6, 1930.  R. S. SANFORD ET AL  1,756,995
LUBRICANT GUARD FOR BRAKES

Filed Jan. 8, 1926

INVENTOR
ROY S. SANFORD
OTTO B. CLARK
BY
ATTORNEY

Patented May 6, 1930

1,756,995

UNITED STATES PATENT OFFICE

ROY S. SANFORD AND OTTO B. CLARK, OF SOUTH BEND, INDIANA, ASSIGNORS TO BENDIX BRAKE COMPANY, OF CHICAGO, ILLINOIS, A CORPORATION OF ILLINOIS

LUBRICANT GUARD FOR BRAKES

Application filed January 8, 1926. Serial No. 79,954.

This invention relates to brakes, and its principal object is to provide efficient and inexpensive means for preventing oil (or other lubricant) from dripping out of the end of the axle housing onto the brake. Preferably this is done by forming and arranging the backing plate of the brake, and the flange on the axle housing to which it is attached, to provide an oil passage to which the oil is directed by a flange on the wheel hub. The drawings show the invention embodied in a semi-floating axle, in which arrangement the flange on the wheel hub is preferably cup-shaped, encircling the end of the axle housing.

Figure 1:
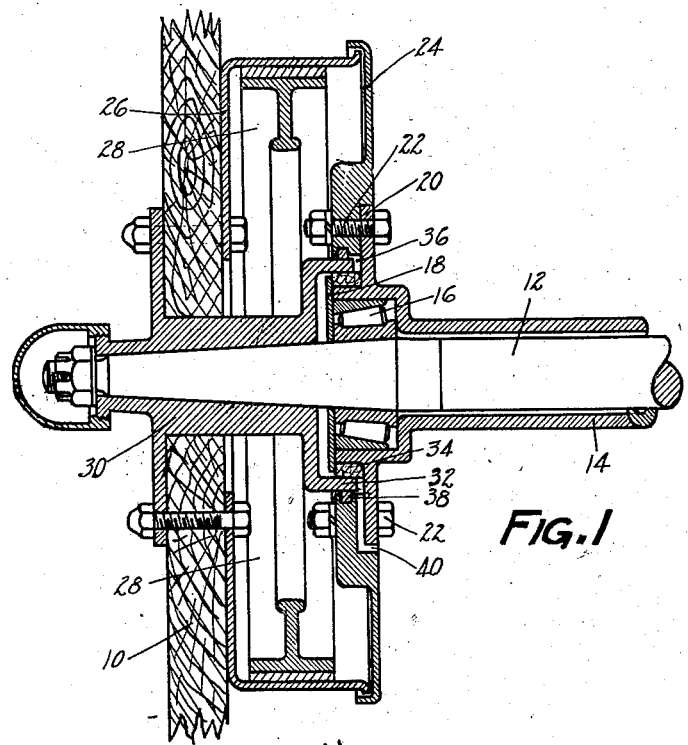
Figure 2:
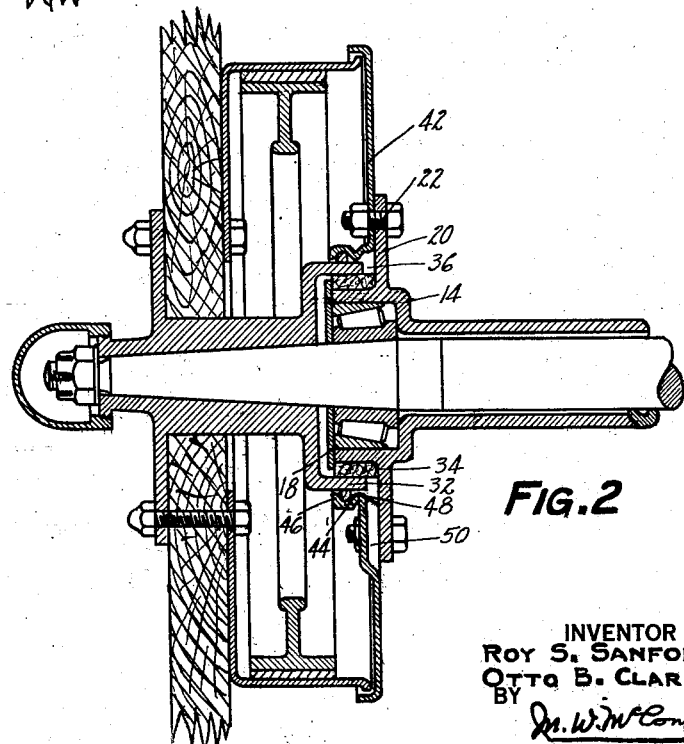

Other features of novelty, including various desirable details of construction and arrangement, will be apparent from the following description of the illustrative embodiments shown in the accompanying drawings, in which:

Fig. 1 is a vertical section diametrically through one wheel and its brake, and through a semi-floating axle; and Fig. 2 is a similar view, but showing a modified backing plate for the brake.

In the arrangement illustrated, the wheel 10 is driven by a semi-floating live axle 12 projecting from the end of an axle housing 14, in the end of which the axle is supported by a roller bearing 16 held by a plate 18 on the axle. The axle housing is enlarged at its end to receive the bearing 16, and the enlarged end is shown with a radial flange 20 to which is secured by bolts 22 a backing plate 24 for the brake. Backing plate 24, and a drum 26 rotating with the wheel, serve as a housing for the brake shoes 28, or their equivalent.

Live axle 12 drives wheel 10 through the medium of a wheel hub 30 having a cup-shaped oil-directing flange 32 adjacent and encircling the end of housing 14, a sealing gasket 34 being provided between the inside of flange 32 and the outside of the end of housing 14 beyond flange 20. Plate 18 also serves to confine gasket 34.

Flange 32 directs any oil or other lubricant, which may drip from the end of housing 14, to an annular pocket 36 defined by the side of the flange 20, backing plate 24, and the end of flange 32. Most of the oil is kept out of this pocket by gasket 34. A second sealing gasket 38 is arranged between part of backing plate 24 and the outside of the cup-shaped flange 32.

At the bottom of the brake, pocket 36 communicates with a passage 40, shown as cast in plate 24, opening below flange 20 on the opposite side of plate 24 from the wheel, and directing the oil safely away from shoes 28. It will be seen that passage 40 extends from the side next the wheel (i. e. inside the brake) to the side opposite the wheel, between the two sealing gaskets 34 and 38.

The arrangement of Fig. 2 differs from that just described principally in that the backing plate 42 is stamped from sheet metal. This plate is formed with an offset 44 extending axially inward of the brake, and terminating in a short flange 46 generally parallel to the main body of the plate, thus forming an annular pocket for sealing gasket 48 engaging the outside of flange 32. At the bottom of the brake, a radial groove 50 is pressed into the plate to form a passage corresponding to passage 40.

While two illustrative embodiments have been described in detail, it is not our intention to limit the scope of the invention to those particular embodiments, or otherwise than by the terms of the appended claims.

We claim:

1. A drive wheel having a brake, and driving and supporting means for the wheel comprising, in combination, an axle housing having a radial flange a short distance from its end, a backing plate for the brake secured to said flange, the plate and flange being constructed and arranged to provide a passage between them below the axle from the side of the plate next the wheel to the side opposite the wheel, a live axle in the housing, a wheel hub on the end of the live axle having a cup-shaped flange encircling the end of the housing to catch oil dripping from the housing and direct it to said passage, a sealing gasket between the interior of the cup-shaped flange and the end of the housing beyond said radial flange, and a sealing gasket between the outer surface of the cup-shaped flange and the backing plate, the passage for the oil being between the two gaskets.

2. A brake backing plate of pressed metal with a central opening, to be mounted on an axle housing, and formed with an offset axially inward of the brake about the opening terminating in a short radial flange generally parallel to the main portion of the brake, and having on its face on the outside and at the bottom of the brake a radial oil-draining groove communicating with the annular pocket formed by said offset and flange.

In testimony whereof, we have hereunto signed our names.

ROY S. SANFORD.
OTTO B. CLARK.